W. M. VALLETTE.
RUBBER ROLLER CAR FENDER.
APPLICATION FILED OCT. 28, 1907.
921,316.
Patented May 11, 1909.
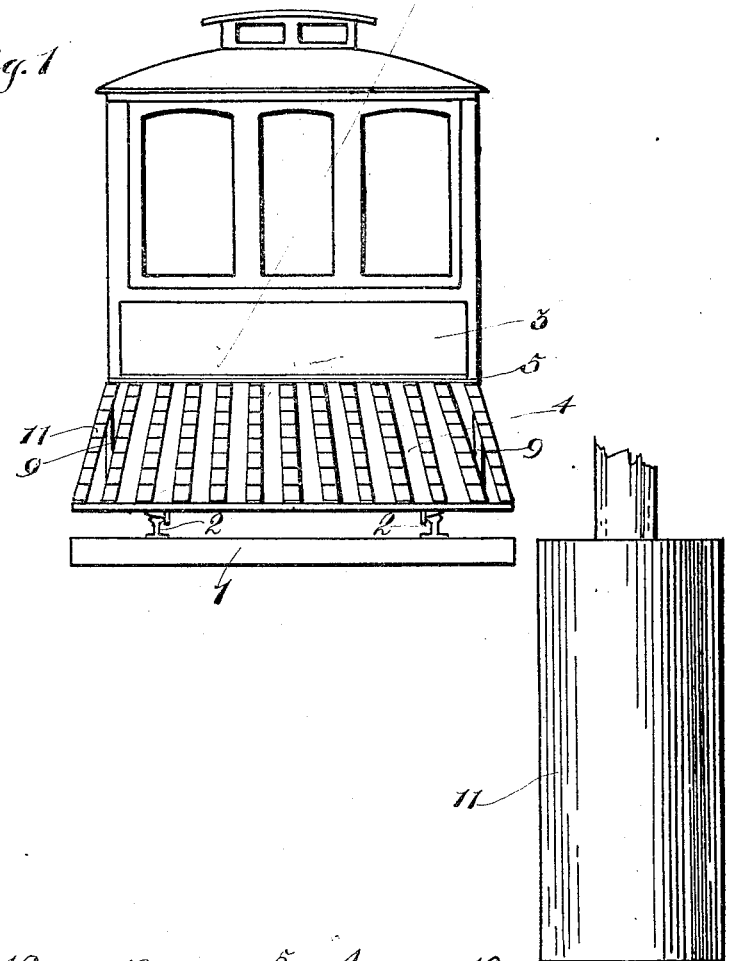
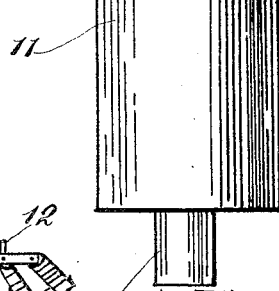
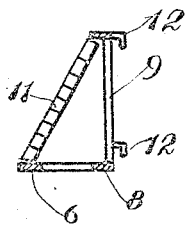
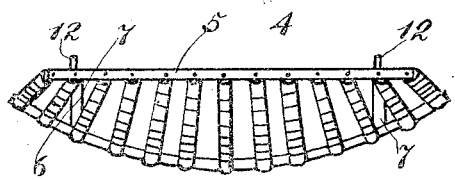
WITNESSES:
INVENTOR
William M. Vallette
BY
Medina and Griffin
ATTORNEYS

UNITED STATES PATENT OFFICE.

WILLIAM M. VALLETTE, OF SAN FRANCISCO, CALIFORNIA.

RUBBER-ROLLER CAR-FENDER.

No. 921,316.  Specification of Letters Patent.  Patented May 11, 1909.

Application filed October 28, 1907. Serial No. 399,407.

*To all whom it may concern:*

Be it known that I, WILLIAM M. VALLETTE, a citizen of the United States, residing at San Francisco, in the county of San Francisco and State of California, have invented a new and useful Rubber-Roller Car-Fender, of which the following is a specification in such full and clear terms as will enable those skilled in the art to construct and use the same.

This invention relates to car fenders which are adapted to prevent persons falling against the car from being carried under the car and having their legs or arms cut off by the wheels.

The principal object of the invention is to produce a car fender which will be cheap and easily applied to the cars and which will effectively push persons falling in front of the car off the track.

Another object of the invention is to produce a fender that will not seriously injure the person even if struck by the fender, a rubber roller being used to receive the impact of the falling person.

In the drawings, in which the same numerals are applied to the same parts throughout, Figure 1 is a front elevation of a car showing the fender attached to it.
Fig. 2 is a vertical section of the fender showing only the center roller, Fig. 3 is a plan of the fender, and Fig. 4 is a front elevation of one of the rollers and a part of its supporting rod full size.

The numeral 1 is applied to the cross ties, 2, 2, are the rails, and 3 the car.

The numeral 4 is applied to the fender, and it will be observed that the fender comes down almost to the track, only an inch or two clearance being allowed, in order that a person struck by the car cannot possibly be carried under the same. The fender has a top rail 5 which extends entirely across the front of the car, and a lower curved rail 6, said latter rail being held in place by means of arms 7, 7 which extend forwardly from the back rail 8, said back rail being connected with the top rail 5 by means of the bars 9, 9. In the frame thus formed are journaled a number of bars 10, each bar carrying a series of rubber rollers 11 the rollers being made of a grade of soft rubber to make them as soft as is consistent with another function they are called on to carry out. The fender is attached to the car by means of the hooks 12 of which there are four. These hooks form a convenient means for attaching the fender to the car at will and at the same time they allow the fender to be taken off just as easily.

Now it will be noted that if a person falls in the front of a car that the rollers will cause him to at once roll and fall out of the way of the wheels, and in a city most of the accidents are due to persons being struck by the car when they think themselves clear of the same so they are nearly always far enough from the center of the track for the fender to roll them clear of the track when struck.

Having thus described my invention what I claim as new and desire to secure by Letters Patent of the United States is as follows, modifications within the scope of the claim being reserved.

In a car fender, a frame adapted to be secured to the front of a car, a second frame secured to the first frame and at the bottom thereof and projecting from the first frame in a plane substantially at ninety degrees therewith, said latter frame being curved outwardly from the first frame on its outer edge, a series of rods carried from the upper edge of the first frame to the outer edge of the second frame, the outer rods of the set being inclined so they will be closer at the top than at the base thereof, a plurality of rubber rollers on each of the said rods, and hooks carried by the first frame and adapted to secure the fender to a car.

In testimony whereof I have set my hand this 10th day of October A. D. 1907, in the presence of the two subscribing witnesses.

WILLIAM M. VALLETTE.

Witnesses:
W. T. HESS,
C. P. GRIFFIN.